United States Patent Office 3,355,475
Patented Nov. 28, 1967

3,355,475
IODINE AS A POLYMERIZATION CATALYST FOR CERTAIN SILAZANES AND SILOXANES
Ronald H. Baney, Midland, Mich., assignor to Dow Corning Corporation, Midland, Mich., a corporation of Michigan
No Drawing. Filed Feb. 26, 1964, Ser. No. 347,396
3 Claims. (Cl. 260—448.2)

ABSTRACT OF THE DISCLOSURE

Polymerization catalyst of $I_2$ for

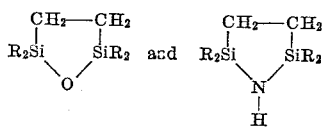

an illustrative example being:

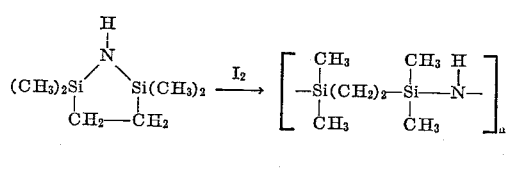

---

This application relates to a new method of polymerization for certain silazanes and siloxanes, which is the process of contacting a composition consisting essentially of at least one compound selected from the group consisting of

where R is selected from the group consisting of the following radicals: alkyl, aryl, haloalkyl, and haloaryl, R' is selected from the group consisting of the alkyl and aryl radicals, and R" is an alkyl radical, with from 0.001 to 5 weight percent of iodine, whereby a polymeric composition is formed.

R can be any alkyl radical such as methyl, ethyl, isopropyl, decyl, octadecyl and myricyl; any aryl radical such as phenyl, tolyl, benzyl, etc.; any haloalkyl radical such as chloroethyl, 3,3,3-trifluoropropyl, 4,5,6-tribromooctyl, etc.; and any haloaryl radical such as chlorophenyl, α,α,α-trifluorotolyl, and dibromobenzyl.

R' can be any alkyl radical such as methyl, ethyl, isopropyl, decyl, and octadecyl, and any haloalkyl radical such as chlorophenyl, 3,3,3-trifluoropropyl and 4,5,6-tribromooctyl.

R" can be any alkyl radical such as methyl, ethyl, isopropyl, decyl and octadecyl.

The process of this application can be used to make homopolymers or copolymers, depending on whether one or more of the above-mentioned ingredients are used in the reaction. However, copolymers containing both silazane and siloxane units are difficult to obtain by the process of this invention.

The process of this application can be run merely by mixing the iodine with the undiluted reactants, or, optionally, non-poral solvents can be added, as long as the solvents do not react with the iodine or the reactants.

The silazanes polymerize rapidly, and therefore, generally do not need heating. The polymerization of the siloxane ingredients is often considerably slower under the process of this invention, and heating is frequently desirable, but one must take care not to allow the iodine to vaporize away.

One way to solve the problem of the loss of iodine by heating is to add the iodine in the form of a heat-decomposable iodine compound such as iodoform, diiodobenzene, mercuric iodide, or N-iodosuccinimide. The iodine is released in the reaction mixture on heating. Thus, by selecting an iodine compound with a decomposition temperature of just slightly above the reaction temperature, its slow decomposition provides a continuous supply of the volatile iodine to the reaction mixture.

This technique of adding the iodine is considered to be within the scope of the claims of this application.

This application also relates to the new compositions of matter disclosed herein, i.e.

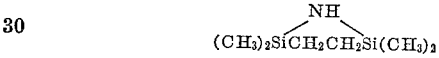

and homopolymers thereof.

It is believed that these homopolymers have the formula

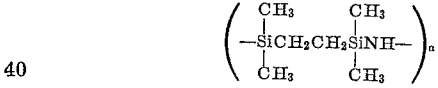

where $n$ is a positive integer of two or more. It is also believed that these homopolymers are endblocked with hydroxyl groups, obtained from the moisture in the atmosphere, etc.

The homopolymers are fluid materials, which exhibit properties that are comparable or superior to their siloxane analogues, for example, while the viscosity of a polymer consisting of

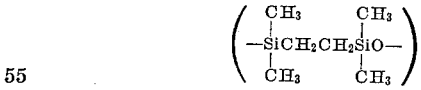

units increases upon heating at 250° C. in the air, similar treatment of the homopolymer described above will cause its viscosity to decrease. However, electrical properties, surface tension, and other properties of the above two polymers are quite similar.

The homopolymer described above is therefore susceptible for use at high temperatures where siloxanes tend to become gummy.

The homopolymer is slowly hydrolyzable, with silazane linkages being replaced by siloxane linkages, and ammonia being evolved. It therefore can perform the function of many siloxane polymers, while simultaneously serving as a dehydrating agent for trace amounts of water.

The monomer of this invention can be made by reacting a diethyl ether solution of

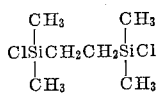

which is known to the art, with liquid anhydrous ammonia. The ammonium chlordie which is formed as a byproduct precipitates out, permitting the solution of diethyl ether and

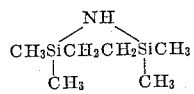

to be separated from the precipitate by filtration. The silazane can then be isolated by distillation.

The temperature of this reaction is not critical, but it is preferred to keep the reaction temperature low, as anhydrous ammonia is easier to handle in the liquid form.

The homopolymer of this invention can be made by adding ferric chloride to the pure monomer, in the proportion of about 0.05 to 5 weight percent of ferric chloride, or by adding iodine in the proportion of about 0.001 to 5 weight percent of iodine. The polymerization reaction takes place rapidly on gentle heating, but it also runs well at room temperature. When employing $FeCl_3$ as a catalyst, the polymerization reaction can be halted when the desired degree of polymerization is reached by dissolving the homopolymer in toluene and filtering to remove the catalyst.

If the catalyst is not removed, the polymerization continues until a gummy material of high molecular weight is formed.

The following examples are illustrative only and should not be construed as limiting the invention, which is properly delineated in the appended claims.

*Example 1*

To 2 ml. of

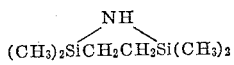

was added about 0.05 g. of iodine crystals. The mixture was shaken, and allowed to stand at room temperature. After 30 minutes, the mixture was viscous oil, indicating that polymerization had taken place.

*Example 2*

To 5 ml. of

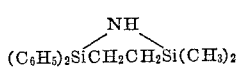

was added 0.1 g. of iodine crystals. The mixture was gently heated, and an increase in the viscosity of the mixture was noted, indicating polymerization. Upon exposure to the air, the viscous mixture cured to an elastomeric composition. This is believed to have occurred through cleavage of some of the phenyl groups by iodine, followed by hydrolysis of the Si—I bonds that were formed in the cleavage reaction by means of atmospheric moisture, and condensation of the silanol groups thereby formed with each other.

*Example 3*

To 25 g. of $([CH_3]_2SiO)_3$ was added 0.5 g. of $I_2$. This was shaken, sealed, and heated at 80° C. for 48 hours. Part of the cyclic trimer was found to have polymerized to a gum in that period of time.

The mixture was allowed to stand at room temperature for one month, during which time the rest of the trimer polymerized to a gum.

*Example 4*

To 10 ml. of

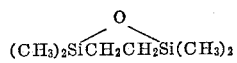

was added 0.1 g. of iodine crystals.
Instantaneous polymerization occurred.

*Example 5*

To 10 ml. of

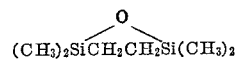

was added 0.5 g. of iodine dissolved in 1 cc. of toluene.
The mixture turned into a sticky gum in 10 minutes.

*Example 6*

To 10 ml. of the silazane of Example 7 was added about 0.1 g. of n-iodosuccinimide.

The mixture was shaken and heated to evolve iodine, upon which rapid polymerization occurred.

*Example 7*

To 300 cc. of anhydrous liquid ammonia in a flask packed in Dry Ice was added one mole of

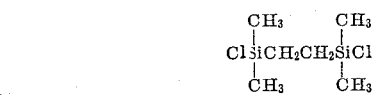

The flask was provided with an $N_2$ atmosphere. The mixture was stirred for 1½ hours, being warmed to room temperature during the period. The remaining ammonia was then removed by heating. An equal portion of diethyl ether was added, and the mixture was shaken and filtered. The filtrate was distilled, and an 87% of the theoretical yield of

was recovered. The density at 25° C. was 0.8417. The refractive index at 25° C. was 1.4351. The boiling point was 141° C., not corrected to sea level pressure.

Example 8

When the following compounds are mixed with iodine crystals in the following proportions, polymeric compositions are formed on gentle heating:

| | Weight, percent | Compound | Weight, percent $I_2$ |
|---|---|---|---|
| (a) | 94 | $\left(\underset{CH_3}{\underset{|}{\phantom{x}}}\text{C}_6\text{H}_5\text{–SiO}\right)_3$ | 3 |
| | 3 | $(C_{18}H_{36}SiO)_3$<br>$\quad|$<br>$\quad C_2H_5$ | |
| (b) | 98 | $[(CH_3)_2CHSiO]_3$<br>$\quad\quad|$<br>$\quad\quad C_3H_7$ | 2 |
| (c) | 10 | $C_{10}H_{21}\underset{CH_3}{\underset{|}{Si}}CH_2CH_2\underset{CH_3}{\underset{|}{Si}}CH(CH_3)_2$ with bridging O | 0.1 |
| | 88 | $CF_3CH_2CH_2\underset{CH_3}{\underset{|}{Si}}CH_2CH_2\underset{CH_3}{\underset{|}{Si}}CH_2CH_2CF_3$ with bridging O | |
| (d) | 99 | $Cl\text{–}C_6H_4\text{–}\underset{CH_2Cl}{\underset{|}{Si}}CH_2CH_2\underset{CH_2Cl}{\underset{|}{Si}}\text{–}C_6H_4\text{–}Cl$ with bridging O | 1 |
| (e) | 99.5 | $CF_3CH_2CH_2\underset{C_2H_5}{\underset{|}{Si}}CH_2CH_2\underset{C_2H_5}{\underset{|}{Si}}CH_2CH_2CF_3$ with bridging NH | 0.5 |
| (f) | 99.999 | $CH_3\text{–}C_6H_4\text{–}\underset{CH_3}{\underset{|}{Si}}CH_2CH_2\underset{CH_3}{\underset{|}{Si}}\text{–}C_6H_4\text{–}CH_3$ with bridging NH | 0.001 |
| (g) | 60 | $(C_2H_5SiO)_3$<br>$\quad\quad|$<br>$\quad\quad CH_3$ | 1 |
| | 39 | $Cl\text{–}C_6Cl_4\text{–}CH_2CH_2\underset{CH_3}{\underset{|}{Si}}CH_2CH_2\underset{CH_3}{\underset{|}{Si}}CH_2CH_2\text{–}C_6Cl_4\text{–}Cl$ with bridging O | |

That which is claimed is:

1. The process of contacting a composition consisting essentially of at least one compound selected from the group consisting of $$R_2\overset{O}{\overset{\diagup\diagdown}{Si}}CH_2CH_2SiR_2$$

and $$R_2\overset{NH}{\overset{\diagup\diagdown}{Si}}CH_2CH_2SiR_2$$

where R is selected from the group consisting of the following radicals: alkyl, aryl, haloalkyl, and haloaryl; R' is selected from the group consisting of alkyl and aryl radicals; and R" is an alkyl radical, with from 0.001 to 5 weight percent of elemental iodine; whereby a polymeric composition is formed.

2.

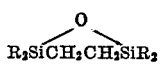

3. A homopolymer of the composition of claim 2.

References Cited

UNITED STATES PATENTS 3,222,320  12/1965  Wolf _____ 260—46.5
3,269,984  8/1966  Vaughn et al. _____ 260—46.5

TOBIAS E. LEVOW, *Primary Examiner.*
J. P. PODGORSKI, *Assistant Examiner.*